(12) United States Patent
Weinhold

(10) Patent No.: US 9,308,682 B2
(45) Date of Patent: Apr. 12, 2016

(54) DEVICE FOR PRODUCING STRAND-SHAPED PRODUCTS

(71) Applicant: Oerlikon Textile GmbH & Co. KG, Remscheid (DE)

(72) Inventor: Jens Weinhold, Chemnitz (DE)

(73) Assignee: OERLIKON TEXTILE GMBH & CO., KG, Remscheid (DE)

( * ) Notice: Subject to any disclaimer, the term of this patent is extended or adjusted under 35 U.S.C. 154(b) by 0 days.

(21) Appl. No.: 13/862,747

(22) Filed: Apr. 15, 2013

(65) Prior Publication Data
US 2013/0236583 A1 Sep. 12, 2013

Related U.S. Application Data

(63) Continuation-in-part of application No. PCT/EP2011/068160, filed on Oct. 18, 2011.

(30) Foreign Application Priority Data

Oct. 22, 2010 (DE) .......................... 10 2010 049 325

(51) Int. Cl.
*B29C 71/02* (2006.01)
*B29C 47/88* (2006.01)
*B29C 55/06* (2006.01)
(Continued)

(52) U.S. Cl.
CPC ......... *B29C 47/8805* (2013.01); *B29C 47/0057* (2013.01); *B29C 55/06* (2013.01); *D01D 10/02* (2013.01); *D01D 10/0436* (2013.01);
(Continued)

(58) Field of Classification Search
CPC B29C 47/8805; B29C 47/0047; B29C 55/06; D01D 10/02; D01D 10/0436

USPC .......................................... 425/143
See application file for complete search history.

(56) References Cited

U.S. PATENT DOCUMENTS

| 3,651,196 A | 3/1972 | Starkweather |
| 5,082,611 A | 1/1992 | Adams et al. |
| 7,501,082 B2 * | 3/2009 | Mencke ...................... 264/40.1 |

FOREIGN PATENT DOCUMENTS

| CN | 101476170 | 7/2009 |
| CN | 102165108 | 8/2011 |

(Continued)

OTHER PUBLICATIONS

PCT/EP2011/068160 International Preliminary Report on Patentability dated Apr. 23, 2013 (10 pages).
(Continued)

*Primary Examiner* — Joseph S Del Sole
*Assistant Examiner* — John Robitaille
(74) *Attorney, Agent, or Firm* — Brinks Gilson & Lione; G. Peter Nichols

(57) ABSTRACT

The invention relates to a device for the production of strand-shaped products such as synthetic bands, fiber strands, monofilaments, or films, which are extruded from a polymer melt. The device includes an extrusion device, a cooling device, several rolling feed units and several processing devices mounted between the rolling feed units. In order to obtain short control paths and compact machine units, the processing devices according to the invention are arranged in tiers one above the other, wherein the rolling feed units face each other at both ends of the processing devices so that the product passes through the processing devices in the opposite direction.

8 Claims, 3 Drawing Sheets

Figure 1:
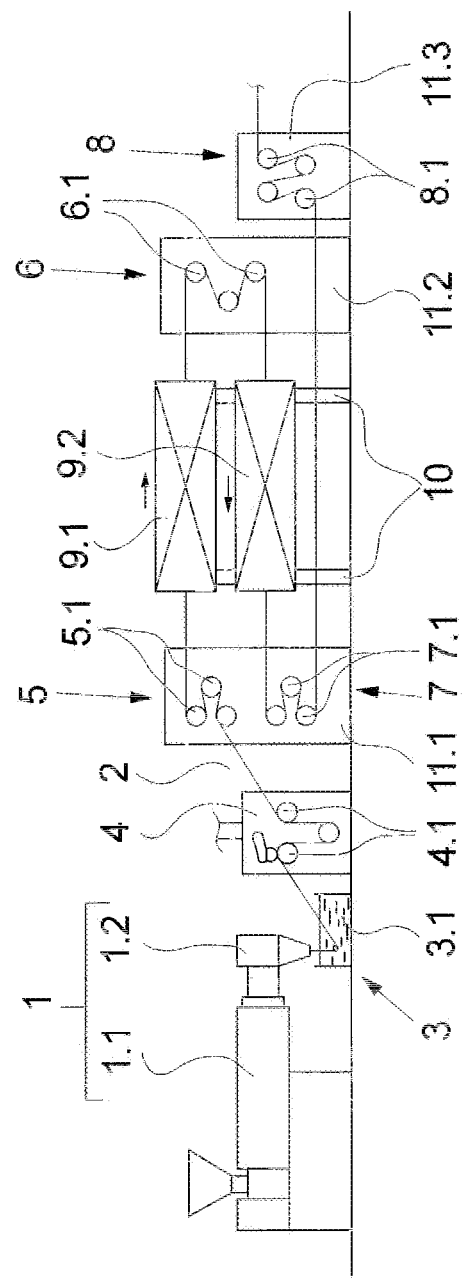

(51) Int. Cl.
*D01D 10/02* (2006.01)
*D01D 10/04* (2006.01)
*D01D 13/02* (2006.01)
*B29C 47/00* (2006.01)

(52) U.S. Cl.
CPC ............ *D01D13/02* (2013.01); *B29C 47/0014* (2013.01); *B29C 47/0019* (2013.01); *B29C 47/0021* (2013.01)

(56) References Cited

FOREIGN PATENT DOCUMENTS

| | | |
|---|---|---|
| CN | 202064049 | 12/2011 |
| DE | 1469051 | 11/1968 |
| DE | 102008059008 | 5/2010 |
| DE | 102009030880 | 12/2010 |
| EP | 0 350 945 | 1/1990 |
| EP | 0 541 133 | 5/1993 |
| EP | 2 415 915 | 2/2012 |
| GB | 919261 | 2/1963 |
| GB | 989110 | 4/1965 |
| GB | 1400522 | 7/1995 |

OTHER PUBLICATIONS

PCT/EP2011/068160 International Search Report dated May 5, 2012 (6 pages including 3 page English translation).

* cited by examiner

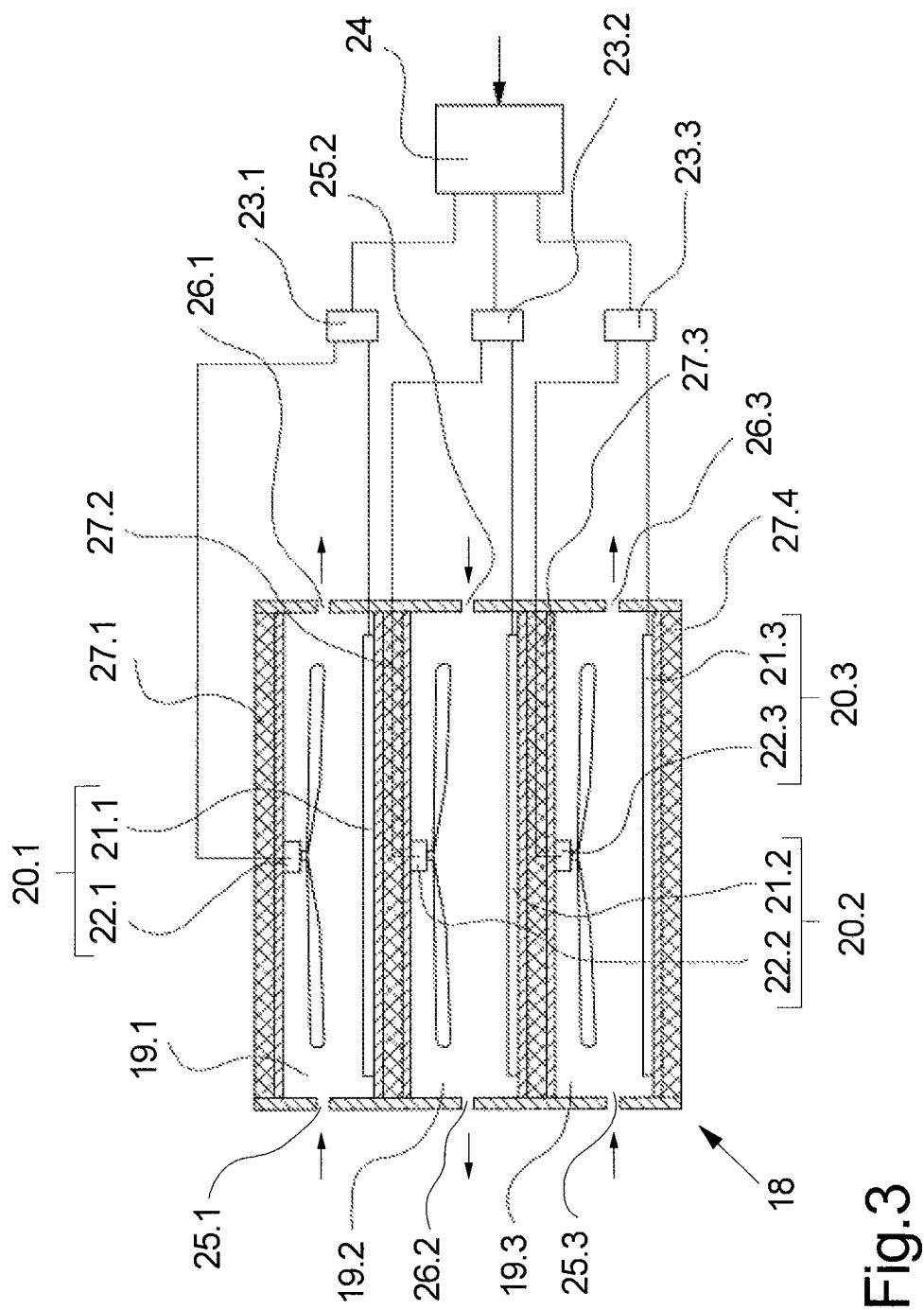

DEVICE FOR PRODUCING STRAND-SHAPED PRODUCTS

This application is a continuation-in-part of and claims the benefit of priority from PCT application PCT/EP2011/068160 filed Oct. 18, 2011 and German Patent Application DE 10 2010 049 325.2 filed Oct. 22, 2010, the disclosure of each is hereby incorporated by reference in its entirety.

The invention relates to a device for the production of strand-shaped products such as synthetic bands, fiber strands, monofilaments or films according to the preamble of Claim 1, and a heating device for use in a device of this type.

A generic device for the production of strand-shaped products is known, for example, from EP 0541133 B1.

With the production of strand-shaped products such as synthetic bands, fiber strands, monofilaments or films, which are extruded from a polymer melt, it is generally known that the product properties such as the tensile strength and the elasticity are generated by means of a multi-step processing of the product directly following the extrusion. As such, the tensile strength and the elasticity of synthetic products are substantially determined by the degree of the stretching. Thus, the known devices for the production of strand-shaped products normally include a plurality of processing devices, which are provided with a plurality of roller feed units disposed behind one another on a longitudinal surface of a machine.

The device known from EP 0541133 B1 includes an extrusion device for the production of synthetic monofilaments, a cooling device, and a plurality of roller feed units and a plurality of processing devices. In a first processing device, disposed between two roller feed units, the monofilaments receive a superheated steam processing, for heating the thermoplastic material to a stretching temperature. The rollers of the roller feed unit are driven at different speeds for the purpose of stretching the monofilament. In the further course, a second processing device follows for stretching the monofilaments in further steps. The processing device is designed as a radiant heating device, through which the monofilaments pass a number of times. For this, re-directing rollers are provided on both sides of the processing device, such that the monofilaments can be fed repeatedly through the radiant heating device. The stretching forces required in the second stretching step are determined thereby through roller feed units allocated thereto. The known device thus includes relatively long longitudinal surfaces of the machine, which require correspondingly long paths to be traveled on the part of the operating personnel for the operation of said devices.

It is therefore the objective of the invention to further develop the generic device for the production of strand-shaped products in such a manner that improved operability of the devices is obtained.

A further aim of the invention lies in providing a generic device for the production of strand-shaped products, by means of which an enhanced use of space within a machine shop is possible.

The objective according to the invention is attained in that the processing devices are disposed in levels, one above another, and that the roller feed units at both ends of the processing devices are opposite one another such that the product passes through the processing devices in opposing directions.

Advantageous further developments of the invention are defined by the characteristics and combinations of characteristics of the dependent Claims.

The invention is also not obvious from the known device in DE 102008059008 A1. With the known device for the production of strand-shaped products, the thermal processing is executed selectively by means of hot air or hot water. For this a water bath device and a convection oven are retained in a frame that can be adjusted in terms of its height, which can be brought into a processing level, depending on the processing setting. The known device is thus also based on the concept that the products are guided in a predetermined material flow direction by means of roller feed units disposed successively.

The invention distinguishes itself from the concept of a predetermined material flow in a fiber path substantially moving in one direction through the roller feed units. Thus it is possible, by means of the processing devices disposed one above another in a multi-level manner, and a corresponding configuration of the roller feed units, to generate processing paths both in the direction of the material flow and counter to the direction of the material flow. Both the processing devices as well as the roller feed units can be designed thereby as compact units. In order to operate the processing devices and the roller feed units, there are no distances, or very short distances, that need to be traveled by an operator.

The processing devices, which are disposed one above another in a multi-level manner, can be adjusted to the requirements of the respective procedure. Thus, different treatments of the strand-shaped products can be executed at the respective processing devices. As such, it is possible, for example, to execute wetting, cooling or heating procedures to be carried out by means of the processing devices. A particularly energy-efficient design of the invention is obtained thereby, such that the processing devices are designed, respectively, for the thermal processing of the products, and include separate heating means, wherein the heating means of the processing devices are designed such that they can be controlled independently of one another. In this manner, advantageous different thermal treatments can be carried out, for example, for stretching the products or allowing said products to relax.

Depending on the design of the processing devices, the heating means can be provided by hot air, a superheated steam, or hot water.

Preferably the device according to the invention is used in the design in which the processing devices are designed as a heating device having a plurality of heating channels disposed one above another in a multi-level manner. For this, the heating channels are designed such that they can be heated independently of one another, such that, in the processing paths between the roller feed units, different forms of thermal processing can be carried out.

The processing devices are preferably retained in a fixed manner in a supporting framework thereby, which is disposed between two roller racks on which the rollers of the roller feed unit are collectively retained. By this means, a very compact machine configuration with relatively short longitudinal surfaces can be obtained.

The roller feed units preferably include three powered rollers with extending roller shells supported thereon, wherein the roller shells can be designed such that they can be heated, or are cold. By this means, an extremely precise processing can be obtained in the production of the strand-shaped products. By means of the roller shells, which can be heated, of the rollers of a roller feed units, advantageous thermal pre-processing can be carried out on the products.

The rollers of a roller feed unit are preferably designed such that they can be powered collectively, and independently of the rollers of neighboring roller feed units. By this means, different speeds can be provided for each of the processing paths. In this manner, speed differences can be set for stretching or relaxing the products.

The objective according to the invention can also be attained in an advantageous manner by means of the use of a heating device having a plurality of heating channels disposed between an input opening and an output opening for the guidance of strand-shaped products a heating device for independently heating each heating channel, wherein the heating channels are disposed one above another in a multi-level manner and include on an end, in an alternating manner, one of a plurality of input openings and one of a plurality of output openings.

With the known heating devices, such as, for example, that disclosed in GB 1,400,522, the processing path is formed by means of a heating channel, which can be heated via a heating means. In order to be able to execute a plurality of treatments in a plurality of processing paths in a variety of ways, the heating device according to the invention includes a plurality of heating channels disposed one above another in a multi-level manner, to each of which a separate heating means is allocated. The heating channels form, thereby, a reversing path, alternating at one end between a plurality of input openings and a plurality of output openings, such that a product passes through the processing paths in opposing directions.

In order to prevent energy losses as well as reciprocating effects by the processing paths, in accordance with an advantageous further development of the heating device according to the invention, a thermal insulating layer is disposed between adjacent heating channels. By this means, larger temperature differences can be obtained for the processing in the heating channels.

Preferably, hot air is used as the heating means, which can be generated within the heating channel by means of a blower and a heating element.

The blowers and heating elements allocated to the heating channels are preferably operated and controlled independently of one another. Thus, temperature regulation is possible for each processing path.

The invention shall be explained in greater detail below with reference to the attached figures based on a few embodiment examples of the device for producing strand-shaped products according to the invention.

Figure 2:
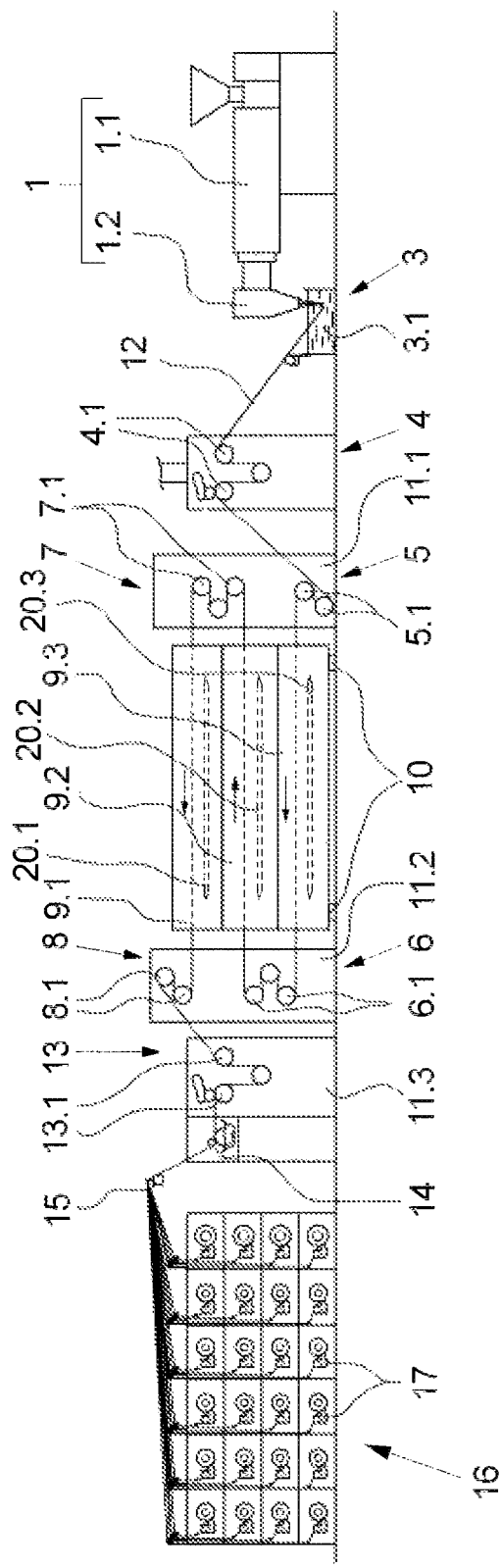

They show:

FIG. 1 schematically, a view of a first embodiment example of the device according to the invention FIG. 2 schematically, a view of another embodiment example of the device according to the invention FIG. 3 schematically, a cross-sectional view of a heating device according to the invention A first embodiment example of the device according to the invention for the production of a strand-shaped synthetic product is shown in a schematic view in FIG. 1. The product can be formed by synthetic bands or synthetic monofilaments, or by an extruded film.

For the production of a product of this type, the embodiment example includes an extrusion device 1, having an extruder 1.1 and a spinning head 1.2. The spinning head 1.2 is connected to the extruder 1.1 and includes a strand pressing tool on its lower surface for extruding a strand-shaped product 2.

A cooling device 3 is associated with the extrusion device 1, which is formed in this embodiment example by a cooling bath 3.1. The cooling bath 3.1 contains a liquid cooling medium for the purpose of cooling and solidifying the freshly extruded product 2 in the form of bands, monofilaments, or a film. A drying device 4 having a plurality of deflecting rollers 4.1 is directly associated with the cooling device 3, for the purpose of drawing the strand-shaped product 2 from the cooling bath 3.1, and to remove and discharge the cooling medium adhering to the product. The excess cooling medium is preferably vacuumed off.

The strand-shaped product 2 is drawn off, thereby, by a first roller feed unit 5, and fed to a first processing device 9.1. The first processing device 9.1 extends thereby between the first roller feed unit 5 and a second roller feed unit 6. The first roller feed unit 5 includes a plurality of rollers 5.1, which are retained in a first roller rack 11.1. The second roller feed unit 6 also includes plurality of rollers 6.1, which are disposed in a second roller rack 11.2. A supporting framework 10 is provided between the roller racks 11.1 and 11.2, on which the processing device 9.1 is disposed. Beneath the processing device 9.1, a second processing device 9.2 is disposed, such that the processing devices 9.1 and 9.2 are supported in a multi-level manner one above another. Each of the processing devices 9.1 and 9.2 forms a processing path, in which a predetermined processing of the product 2 can be executed. For this, the product 2 is guided on the rollers 6.1 of the second roller feed unit 6 such that the product passes through the second processing device 9.2 in the opposite direction. The product 2 is then drawn off thereby, by means of a third roller feed unit 7 having a plurality of rollers 7.1, from the second processing device 9.2, and subsequently redirected 180° in order to be received by a fourth roller feed unit 8, disposed on the opposite end of the processing device 9.2, and to be guided in the direction of the material flow. The powered rollers 7.1 of the third roller feed unit 7 are retained, together with the rollers 5.1 of the first roller feed unit 5, in the roller rack 11.1. In this manner, the product can pass through the processing paths formed by the processing devices 9.1 and 9.2 in opposite directions by means of the roller feed units 5, 6, 7 and 8 disposed on both ends of the processing devices 9.1 and 9.2.

The rollers 5.1 of the first roller feed unit 5 are powered independently of the rollers 7.1 of the third roller feed unit 7. Likewise, the rollers 6.1 of the second roller feed unit 6 are powered independently of the rollers 8.1 of the fourth roller feed unit 8. The rollers 8.1 of the fourth roller feed unit 8 are disposed on a separate roller rack 11.3. Alternatively, it would also be possible to dispose the roller feed units 6 and 8 collectively on the roller rack 11.2.

Between the roller feed units 5 and 6, as well as between the roller feed units 6 and 7, speed differences can be adjusted for the stretching of the product. For this, both the rollers 5.1 of the first roller feed unit 5 as well as the rollers 6.1 or 7.1 of the second roller feed unit 6 and the third roller feed unit 7 can be designed with heated roller shells. In this respect, the processing device 9.1 and the processing device 9.2 could, in each case, execute a thermal processing of the product, in order to obtain a multi-step stretching. Thus, for example, the first processing device could be a water bath with a hot water, or a steam channel with superheated steam. The second processing device 9.2 could be a designed as a heating device with a heating channel, or a water bath supplied with hot water. Independently of the execution and design of the processing devices 9.1 and 9.2, it is significant that processing paths for the product, running in opposite directions, are formed by the processing devices 9.1 and 9.2, disposed one above another in a multi-level manner, and said paths can be guided between roller feed units 5, 6, and 7 lying opposite one another in the roller racks 11.1 and 11.2.

The product fed by the last roller feed unit 8 through the rollers 8.1 can be subsequently fed directly to a winding device or, alternatively, to further processing devices. Thus, with the production of, for example, monofilaments or bands, it is possible to combine a plurality of said products, and to texture said products prior to the separate winding thereof.

With the embodiment example depicted in FIG. 1, the strand-shaped product 2 is stretched in a plurality of steps. Alternatively, there is also the possibility of, aside from the stretching, subsequently executing a shrinking procedure to the strand-shaped product 2. In a shrinking procedure, also known as a relaxation, the products, such as monofilaments or bands, are fed with a slight excess between two roller feed units in order to reduce the tension generated in the synthetic material. For this, preferably, the product is likewise subjected to a thermal processing.

A possible embodiment example of a multiple processing of this type, by means of stretching and relaxing using a device for the production of monofilaments, is depicted in an exemplary manner in FIG. 2. The embodiment example according to FIG. 2 includes an extrusion device 1, a cooling device 3, and a drying device 4, which are designed such that they are substantially identical to those in the embodiment example specified above. For this, the spinning head 1.2 of the extrusion device 1 includes a plurality of nozzle holes on its lower surface, from which a bundle of monofilaments 12 are extruded. The monofilaments 12 are cooled in the cooling bath 3.1 of the cooling device 3, and fed to the drying device 4. Subsequently, the monofilaments 12 are fed through the rollers 5.1 of a first roller feed unit 5 to a multi-step thermal processing. For this, three processing devices 9.1, 9.2, and 9.3 are disposed one above another in a multi-level manner on a supporting framework 10. Each of the processing devices 9.1, 9.2 and 9.3 includes a heating means 20.1, 20.2, and 20.3, respectively, which can be controlled independently of one another, such that in a first processing path through the processing device 9.1, a first thermal processing can be executed. In the subsequent processing paths of the processing devices 9.2 and 9.3, running in opposite directions, further thermal processing of the monofilaments 12 can be carried out.

A plurality of roller feed units are allocated to the processing devices 9.1, 9.2, and 9.3 at the ends thereof, retained on the roller racks 11.1 and 11.2. The rollers 5.1 of the first roller feed unit 5 and the rollers 7.1 of the third roller feed unit 7 are disposed such that they extend outward on the roller rack 11.1. The rollers 6.1 of the second roller feed unit 6 and the rollers 8.1 of the fourth roller feed unit 8 are retained above one another in the opposite roller rack 11.2 such that they extend outward. The rollers of the roller feed units 5, 6, 7, and 8 are powered independently of one another. Thus, the rollers 5.1 of the first roller feed unit 5, for example, can be powered collectively by means of an electric motor and a gear train. By this means, speed differences can be adjusted between the roller feed units 5, 6, 7, and 8 for the purpose of stretching or relaxing. In this manner it is possible, for example, to execute a complete stretching between the rollers 5.1 of the first roller feed unit 5 and the rollers 6.1 of the second feed device 6. In the subsequent processing paths of the processing devices 9.2 and 9.3, relaxing and fusing can be carried out on the monofilaments 12.

In the further course of the material flow, a fifth roller feed unit 13 with the rollers 13.1 and a subsequent preparation device 14 are provided on the longitudinal surface of the machine. The rollers 13.1 of the fifth roller feed unit 13 are retained on a separate roller rack 11.3. The preparation device 14 is followed by a winding device 16 having a plurality of winding stations 17. For this, the monofilaments 12 are separated after the preparation via a distribution rail 15, and fed to the individual winding stations 17 of the winding device 16.

With the embodiment example depicted in FIG. 2, the processing devices 9.1, 9.2 and 9.3 are provided for thermal processing, and can be formed, for example, by a heating device 18. An embodiment example of a heating device 18 of this type is schematically depicted in FIG. 3 in a cross-sectional view. The embodiment example of the heating device 18 according to the invention includes three heating channels 19.1, 19.2, and 19.3, disposed one above another in a multi-level manner. The heating channels 19.1, 19.2, and 19.3 are designed such that they are identical within the heating device 18, and include, in each case, separate heating means 20.1, 20.2, and 20.3. The heating means 20.1 in the heating channel 19.1 is formed by a first blower 22.1 and a first heating element 21.1. The blower 22.1 and the heating element 21.1 can be controlled by means of a control device 23.1. Accordingly, the heating means 20.2 in the heating channel 19.2 is formed by a second blower 22.2 and a second heating element 21.2. The second blower 22.2 and the second heating element 21.2 are coupled to the control device 23.2. Accordingly, the third heating channel 19.3 is heated by the blower 22.3 and the heating element 21.3, wherein a control device 23.3 is allocated to the blower 22.3 and the heating element 21.3. The control devices 23.1, 23.2 and 23.3 are allocated to a control unit 24.

A first thermal insulation 27.2 is provided between the adjacent heating channels 19.1, and 19.2, and the second thermal insulation 27.3 is provided between the heating channels 19.2 and 19.3, in the interior of the heating device 18. Furthermore, additional thermal insulation 27.1, 27.4 is disposed on the outer walls of the heating channels 19.1 and 19.3.

An input opening and an output opening, respectively, are disposed on the ends of the heating channels 19.1, 19.2, and 19.3, for feeding the strand-shaped product in the form of bands, fiber strands or monofilaments through the hot air atmosphere of the respective heating channels 19.1-19.3. In order to obtain processing paths running in opposite directions, the heating channels 19.1 and 19.3 each include an input opening 25.1 and 25.3 on the left end. The input opening 25.2 is formed on the opposite, right-hand end of the heating device 18 in the case of the middle heating channel 19.2. Accordingly, the output opening 26.2 of the middle heating channel 19.2 is formed on the left end of the heating channel 18. The output openings 26.1 and 26.3 of the heating channels 19.1 and 19.3, respectively, are provided at the opposite, right-hand end.

The heating device 18 depicted in FIG. 3 is particularly suited for use in the embodiment example depicted in FIG. 2. For this, different hot air atmospheres can be incorporated in the heating channels 19.1, 19.2, and 19.3 via the control devices 23.1, 23.2 and 23.3, in order to obtain a thermal processing or stretching or shrinking procedure, or for fusing, in accordance with the thermoplastic material of the monofilament. For this, the given processing parameters can be entered as control commands to the heating means 20.1, 20.2, and 20.3 directly, by means of the control unit 24. By this means, a high degree of flexibility in the execution of the thermal processing can be obtained in the individual processing paths.

REFERENCE SYMBOL LIST 1 extrusion device
1.1 extruder
1.2 spinning head
2 strand-shaped product
3 cooling device
3.1 cooling bath
4 drying device 4.1 redirecting roller
5 first roller feed unit
5.1 roller
6 second roller feed unit
6.1 roller
7 third roller feed unit
7.1 roller
8 fourth roller feed unit
8.1 roller
9.1, 9.2, 9.3 processing device
10 supporting framework
11.1, 11.2, 11.3 roller rack
12 monofilament
13 fifth roller feed unit
13.1 roller
14 preparation device
15 distribution rail
16 winding device
17 winding station
18 heating device
19.1, 19.2, 19.3 heating channel
20.1, 20.2, 20.3 heating means
21.1, 21.2, 21.3 heating element
22.1, 22.2, 22.3 blower
23.1, 23.2, 23.3 control device
24 control unit
25.1, 25.2, 25.3 input opening
26.1, 26.2, 26.3 output opening
27.1, 27.2, 27.3, 27.4 thermal insulation

The invention claimed is:

1. A device for the production of strand-shaped products such as synthetic bands, fiber strands, monofilaments or films, which are extruded from a polymer melt, comprising:
    an extrusion device;
    a cooling device located downstream of the extrusion device;
    two or more thermal processing devices located downstream of the cooling device and disposed between a plurality of powered roller feed units wherein all of the thermal processing devices are disposed one above another in a multi-level manner, with the roller feed units located opposite one another at both ends of the thermal processing devices such that product passes through adjacent thermal processing devices in opposing directions,
    each thermal processing device including a heating channel disposed between an input opening and an output opening to guide strand shaped products;
    each heating channel including a separate heating device for independently heating the respective heating channel;
    each separate heating device including a heating element and a blower to generate hot air within the heating channel, the heating element and the blower configured to be controlled independently of the other heating elements and blowers;
    a thermal insulating layer disposed between adjacent heating channels.

2. The device according to claim 1 wherein each thermal processing device includes a plurality of heating channels disposed one above another in a multi-level manner, such that the plurality of heating channels are configured to be heated independently of one another.

3. The device according to claim 1 wherein the thermal processing devices are retained in a supporting framework in a fixed manner, which is disposed between two roller racks.

4. The device according to claim 3 wherein the roller feed units are disposed on the roller racks.

5. The device according to claim 1 wherein at least one of the roller feed units includes at least three powered rollers with roller shells retained such that they extend outward, wherein the roller shells can be heated.

6. The device according to claim 1 wherein the rollers of one of the roller feed units are configured such that they can be powered collectively and independently of the rollers of an adjacent roller feed unit.

7. The device according to claim 1, wherein each thermal processing device is configured to be independently controlled.

8. The device according to claim 1, wherein each thermal processing device provides one of hot air, superheated steam or hot water.

* * * * *